United States Patent [19]

Anderson

[11] 4,045,406
[45] * Aug. 30, 1977

[54] PLASTIC COMPOSITIONS

[75] Inventor: Arnold L. Anderson, Alma, Mich.

[73] Assignee: Velsicol Chemical Corporation, Chicago, Ill.

[*] Notice: The portion of the term of this patent subsequent to July 5, 1994, has been disclaimed.

[21] Appl. No.: 330,840

[22] Filed: Feb. 8, 1973

[51] Int. Cl.$^2$ ............................................. C08L 77/06
[52] U.S. Cl. .................. 260/45.75 R; 260/45.95 G; 260/45.75 W; 260/45.75 D; 260/45.75 B
[58] Field of Search ................ 260/45.75 R, 45.95 G, 260/613 B, 33.2 R, 2.5 AJ, DIG. 24; 106/15 FP

[56] References Cited

U.S. PATENT DOCUMENTS

| | | | |
|---|---|---|---|
| 3,385,819 | 5/1968 | Gouinlock | 260/45.75 R |
| 3,560,441 | 2/1971 | Schwarcy et al. | 260/45.7 R |
| 3,649,591 | 3/1972 | Murray et al. | 260/45.75 B |
| 3,658,634 | 4/1972 | Yanagi et al. | 161/403 |
| 3,697,456 | 10/1972 | Pitts et al. | 260/45.75 B |
| 3,717,609 | 2/1973 | Kutner | 260/45.95 G |

OTHER PUBLICATIONS

ASTM D-2863-70, 1971, Annual Book of ASTM Standards, Part 27, American Society for Testing Materials.

*Primary Examiner*—M. J. Welsh
*Attorney, Agent, or Firm*—Robert M. Phipps; James J. Mullen

[57] ABSTRACT

Plastic compositions containing nylons and bis-phenoxy compounds having the formula:

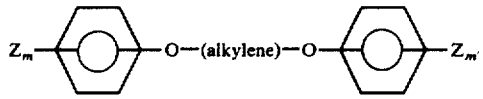

wherein Z is bromine, $m$ and $m'$ are each integers having a value of 1-5 and alkylene is a straight or branched chain alkylene group having 1 to 6 carbon atoms.

15 Claims, No Drawings

PLASTIC COMPOSITIONS

The prior art considered in conjunction with the preparation of this application is as follows: U.S. Pat. Nos. 2,130,990; 2,186,367; 2,329,033; 3,666,692; 3,686,320; 3,658,634; German Pat. No. 1,139,636; German Pat. No. 2,054,522; Japanese Pat. No. (72) 14,500 as cited in Volume 77, Chemical Abstracts, column 153737k (1972); Chemical Abstracts, Volume 13, column 448[5]; Chemical Abstracts, Volume 31, column 7045[9]; and Journal of the Chemical Society, pages 2972-2976 (1963). All of these publications are to be considered as incorporated herein by reference.

This present invention relates to plastic compositions containing nylon. More specifically, the present invention covers plastic compositions containing nylon and certain bis-phenoxy compounds (hereinafter defined) as flame retardants for said plastic compositions.

Nylon and utility thereof are known in the art as exemplified by *Polyamide Resins*, D. E. Floyd, (Reinhold Plastics Applications Series), Reinhold Publishing Corporation, New York, 1958 and *Modern Plastics Encyclopedia* 1972-1973, Vol. 49; No. 10A, October, 1972, pages 54, 56-58, 61, 151, 152, and 205-213 and which publications are in toto incorporated herein by reference.

The need for flame retarding nylon plastics has also been recognized in the art as exemplified by U.S. Pat. Nos. 3,422,048 and Modern Plastics Encyclopedia, ibid, pages 205-213 and 456-458 and which publications are in toto incorporated herein by reference.

The resultant disadvantages in the utilization of various prior art materials as flame retardants for nylon include, without limitation, factors such as thermal migration, heat instability, light instability, non-biodegradable, toxicity, discoloration and the large amounts employed in order to be effective. Thus, there is always a demand for a material which will function as a flame retardant in nylons and concurrently will not, by incorporation therein, adversely effect the chemical and/or physical and/or mechanical properties of the resultant nylon plastic composition.

The prior art problem of providing a flame retarded nylon composition having desired chemical, physical and mechanical properties has now been substantially solved by the present invention and the above-described disadvantages substantially overcome.

Accordingly, one of the main objects of the present invention is to provide nylon plastic compositions which are flame retarded.

Another object of the present invention is to provide a material for nylon plastic compositions which will not substantially adversely effect the chemical and/or physical and/or mechanical properties of said compositions.

A further object of the present invention is to provide a flame retardant which is economic and easy to incorporate into nylon plastics without being degraded or decomposed as a result of blending or processing operations.

It has been found that the foregoing objects can be obtained by the incorporation of a new class of bis-phenoxy compounds in nylons to subsequently provide flame retarded compositions which exhibit outstanding chemical, physical and mechanical properties.

The bis-phenoxy compounds used in the present invention compositions have the formula

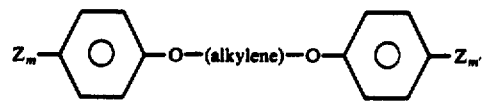

In Formula I above, Z is bromine, $m$ and $m'$ are each an integer having a value of 1 to 5 inclusive and "alkylene" is a straight or branched chain alkylene group having from one to six carbon atoms and includes, without limitation, groups such as

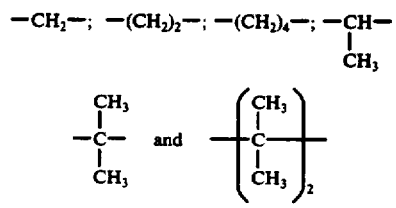

It is to be understood that all the compounds falling within Formula I above and as heretofore defined are generically described herein as "bis-phenoxy" compounds.

Representative, but without limitation, of said bis-phenoxy compounds are the following:

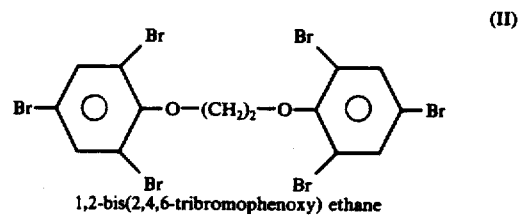

1,2-bis(2,4,6-tribromophenoxy) ethane

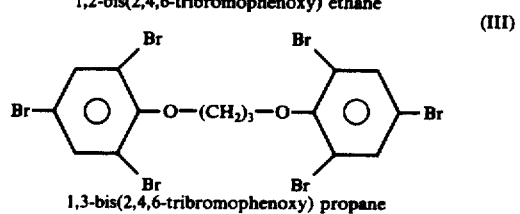

1,3-bis(2,4,6-tribromophenoxy) propane

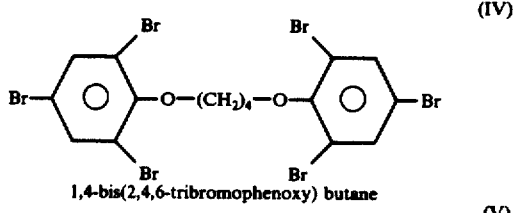

1,4-bis(2,4,6-tribromophenoxy) butane

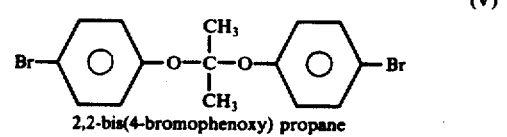

2,2-bis(4-bromophenoxy) propane

In general, the bis-phenoxy compounds are prepared by reacting a halogenated phenol with a halogenated alkane at elevated temperatures in the presence of a basic material such as alkali metal hydroxides, carbonates, bicarbonates, oxides and hydrides. The preferred alkali metals are potassium and sodium. Where one desires to increase, for example, ease of handling the reaction mass, solvents such as ketones (e.g. acetone, methyl ethyl ketone, and methyl iso-butyl ketone), alcohols (e.g. methanol, ethanol, iso-propyl alcohol, butyl alcohol and glycols), or aqueous solvents (e.g. water, a mixture of water and alcohol and a mixture of water and ketone) can be employed. The desired end product i.e. the bis-phenoxy compound, can be recovered from the reaction mass via various methods such as distillation or crystallization. Where the end product requires recovery via crystallization, various aromatic solvents such as benzene, toluene, xylene, dichlorobenzene and the like can be used.

Specifically, the bis-phenoxy compounds are prepared according to the following reactions:

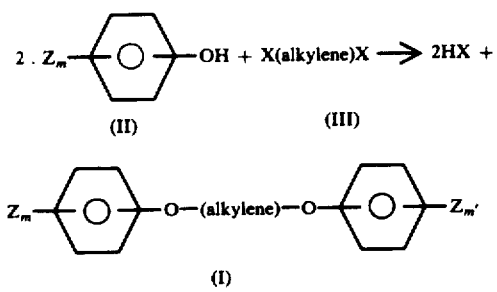

In the above reaction, X is halogen, preferably chlorine and alkylene is the same as herein defined. Where $m$ and $m'$ are different integers, then equivalent molar portions of the particular halogenated phenol are used with equivalent portions of dissimilar halogenated phenol.

The above reaction is conducted at temperatures ranging from the freezing point of the initial reaction mass to the boiling point thereof. Preferably the temperatures are from about 40° C to about 200° C and more preferably from about 50° C to about 175° C. It is to be understood that the reaction can be conducted under sub-atmospheric (e.g. 1/10-8/10 atmospheres), atmospheric or super-atmospheric (e.g. 1.5-10 atmospheres) pressure. Preferably, the reaction is carried out at atmospheric pressure.

The above-described processes can be carried out with conventional, readily available chemical processing equipment. For example, a conventional glass-lined vessel provided with heat transfer means, a reflux condenser and a mechanical stirrer can be advantageously utilized in practicing any of the preferred embodiments of the invention described in the examples set forth herein.

The amount of bis-phenoxy compound employed in the present invention compositions is any quantity which will effectively render the nylon containing composition flame retardant. In general, the amount used is from about 1% to 25% by weight, based on the total weight of the composition. Preferably, the amount employed is from about 5% to about 20% by weight. It is to be understood that any amount can be used as long as it does not substantially adversely effect the chemical and/or physical and/or mechanical properties of the end polymer composition. The amount utilized, however, is such amount which achieves the objectives described herein.

It is to be understood that the term nylon as used herein means any long chain synthetic polymeric amide which has recurring amide groups as an integral part of the main polymer chain. This term includes, without limitation, commercially available materials such as polycaprolactam (nylon 6); the polyamides which are derived from the condensation of a dicarboxylic acid with a diamine, such as polyhexamethylene adipamide (66 nylon) and polyhexamethylene sebacamide (610 nylon); and copolymers thereof which may be designated as 66/610/6 nylon, 66/610 nylon, 66/6 nylon, and the like, such as a copolymer of hexamethylene adipamide units and hexamethylene dodecamide units (66/612 nylon). This term also includes polyamide molding resins such as those disclosed in U.S. Pat. Nos. 2,071,250; 2,071,251; 2,130,523; 2,130,948; and 3,630,988. All of these publications are to be considered as incorporated herein by reference.

Thus the nylon used in the present invention compositions is any nylon herein defined and which one so desires to flame retard. It is to be understood that the nylon used can be a "virgin" material, i.e. substantially free of additives such as stabilizers, plasticizers, dyes, pigments, fillers, and the like, or the nylon can have additives (such as those mentioned and described herein) already contained therein or added concurrently with or after the addition of the bis-phenoxy compounds.

Another facet of the present invention relates to the use of certain metal compounds with the bis-phenoxy compounds to promote a cooperative effect therebetween and thus enhance the flame retardancy of the resultant plastic composition as compared to the flame retardancy of either one component used separately. These "enhancing agents" are from the group antimony, arsenic, bismuth, tin and zinc-containing compounds. Without limitation, examples of said enhancing agents include $Sb_2O_3$, $SbCl_3$, $SbBr_3$, $SbI_3$, $SbOCl$, $As_2O_3$, $As_2O_5$, $ZnBO_4$, $BaB_2O_4.H_2O$, $2.ZnO.3B_2O_3.3.5H_2O$ and stannous oxide hydrate. The preferred enhancing agent is antimony trioxide.

The amount of enhancing agent employed in the present invention compositions is any amount which when used with said bis-phenoxy compounds will promote a cooperative effect therebetween. In general, the amount employed is from about 1% to about 15%, preferably from about 2% to about 10%, by weight, based on the total weight of plastic composition. Higher amounts can be used as long as the desired end result is achieved.

It is also within the scope of the present invention to employ other materials in the present invention compositions where one so desires to achieve a particular end result. Such materials include, without limitation, adhesion promotors; antioxidants; antistatic agents; antimicrobials; colorants; flame retardants such as those listed on pages 456–458, Modern Plastics Encyclopedia, ibid, (in addition to the new class of flame retardants described herein); heat stabilizers; light stabilizers; pigments; plasticizers; preservatives; ultraviolet stabilizers and fillers.

In this latter category, i.e. fillers, there can be mentioned without limitation, materials such as glass; carbon; cellulosic fillers (wood flour, cork and shell flour); calcium carbonate (chalk, limestone, and precipitated calcium carbonate); metal flakes; metallic oxides (aluminum, beryllium oxide and magnesia); metallic powders (aluminum, bronze, lead, stainless steel and zinc); polymers (comminuted polymers and elastomerplastic blends); silica products (diatomaceous earth, novaculite, quartz, sand, tripoli, fumed colloidal silica, silica aerogel, wet process silica); silicates (asbestos, kaolimite, mica, nepheline syenite, talc, wollastonite, aluminum silicate and calcium silicate); and inorganic compounds such as barium ferrite, barium sulfate, molybdenum disulfide and silicon carbide.

The above mentioned materials, including fillers, are more fully described in Modern Plastics Encyclopedia, ibid, and which publication is incorporated herein (in toto) by reference.

The amount of the above described materials employed in the present invention compositions can be any quantity which will not substantially adversely effect the desired results derived from the present invention compositions. Thus, the amount used can be zero (0) percent, based on the total weight of the composition, up to that percent at which the composition can still be classified as a plastic. In general, such amount will be from about 0% to about 75% and specifically from about 1% to about 50%.

The bis-phenoxy compounds can be incorporated in to the nylon at any processing stage in order to prepare the present invention compositions. In general, this is undertaken prior to fabrication either by physical blending or during the process of forming nylon per se.

2863-70. The UL 94 is, in general, the application of a burner to a test specimen (strip) for a certain period of time and observation of combustion, burning, and extinguishment. This procedure is fully set forth in Underwriters' Laboratories bulletin entitled UL 94, Standard for Safety, First Edition, September 1972 and which is incorporated herein by reference. ASTM No. D-2863-70 is a flammability test which correlates the flammability of a plastic specimen to the available oxygen in its immediate environment; this correlation is stated as an Oxygen Index, O.I., level predicated upon the percent oxygen in the gaseous medium which is required to just provide a steady state of continuous burning of the plastic specimen. This ASTM method is fully described in 1971 Annual Book of ASTM Standards - Part 27, published by the American Society For Testing and Materials, 1916 Race Street, Philadelphia, Pa.; this publication is to be considered as incorporated (in toto) herein by reference.

The results of these flammability tests are shown in Table I.

TABLE I

| FLAMMABILITY DATA FOR NYLON PLASTIC COMPOSITIONS CONTAINING BIS-PHENOXY COMPOUNDS | | | | | |
|---|---|---|---|---|---|
| FORMULATION NO. | BIS-PHENOXY COMPOUND FORMULA | % | ENHANCING AGENT $Sb_2O_3$, % | OXYGEN INDEX % | UL 94 |
| 1. | — | 0 | 0 | 23.0 | SB |
| 2. | III | 10 | 0 | 23.5 | SB |
| 3. | III | 10 | 3 | 24.5 | SB |
| 4. | III | 13 | 3 | 27.5 | SE-2 |
| 5. | II | 10 | 0 | 23.5 | SB |
| 6. | II | 10 | 3 | 24.0 | SB |
| 7. | II | 13 | 3 | 27.0 | SE-2 |

Where one so desires, the bis-phenoxy compounds may be micronized into finely divided particles prior to incorporation into the nylon.

EXAMPLE I

A virgin nylon 6 plastic material, (Zytel 211, a product of E. I. du Pont de Nemours and Co., Wilmington, Delaware) is utilized as the base resin in order to prepare 7 formulations (plastic compositions). With the exception of formulation No. 1, the particular bis-phenoxy compound (and the antimony trioxide enhancing agent where indicated) is incorporated into the plastic by adding both to a Brabender mixer ("Plastic-Corder", Torque Rheometer, Model PLV-150, C. W. Brabender Instruments Inc., South Hackensack, N.J.). The mixer is equipped with a pair of roller type blades positioned within a head provided with heat transfer means.

The resultant mixture is heated to about 245° C.; at this temperature, it is in a molten state. The percentages by weight of each component utilized in the respective formulations are listed in Table I. Each formulation is discharged from the mixer and upon cooling solidifies and is ground into chips. The chips are subjected to compression molding in a Wabash press by placing said chips between two platens, the bottom of which contains four equal size depressions 3 inches by 5 inches by one-eighth inch deep. The top platen is then placed over the bottom platen and heat transfer means supplied thereto in order to melt said chips and thus provide solid samples (after cooling) for testing.

Portions of the solid samples of each respective formulation (Nos. 1-7) prepared according to the above described procedure are then subjected to two different standard flammability tests, i.e. UL 94 and ASTM D-

Referring to Table I, the bis-phenoxy compound formula II or III relates to the structural formulae heretofor set forth; a difference of 2% in the Oxygen Index values is considered significant; and the UL 94 values are on a graduated scale wherein the highest degree to lowest degree of flame retardancy is respectively SE-0, SE-1, SE-2, SB and Burns.

The results shown in Table I demonstrate the unique effectiveness of these bis-phenoxy compounds as flame retardants for nylon. Specifically, formulation No. 1 (the control) had a O.I. of 23.0 and UL 94 value of SB. In Nos. 2 and 5, the use of the particular bis-phenoxy compound results in an increase in fire retardancy as measured by O.I. (While these formulations also had a SB rating, UL 94, the individual U.L. rating has a wide range of values and thus the O.I. number is, in these cases, more indicative of increased flame retardancy).

The use of an enhancing agent such as $Sb_2O_3$ to promote a cooperative effect between such agent and the bis-phenoxy compound is fully demonstrated via the results obtained from testing formulation Nos. 3, 4, 6 and 7. The highest UL 94 ratings and significantly higher O.I. values (1.5–4.5% increase) are obtained.

EXAMPLE II

Portions of the solid samples of Formulation Nos. 1, 3, 4, 6 and 7, prepared according to the above described procedure of Example I are subjected to the following ASTM tests in order to ascertain other properties of the resultant plastic composition:

1. Tensile Strength (at break) : ASTM Test No. D638-61T;
2. Flexural Modulus : ASTM Test No. D790-63;
3. Notched Izod Impact : ASTM Test No. D256-56; and 4. Heat Distortion Temperature (HDT) : ASTM Test No. D648-56.

Each of the aforementioned ASTM Tests are standard tests in the art and are utilized collectively in order to ascertain the efficacy of a polymeric system as an overall flame retarded composition for commercial application. All of these ASTM Tests are to be considered as incorporated herein by reference.

The results of these ASTM tests are shown in Table II.

TABLE II

Properties of Nylon Plastic Compositions Containing Various Additives

| Formulation | Tensile Strength psi | Flexural Modulus $10^5$ psi | Notched Izod Impact ft.lb/in. | HDT °F | O.I. % | UL 94 |
|---|---|---|---|---|---|---|
| 1) No. 1 (control) | 7,400 | 2.5 | 2.5 | 122 | 23.0 | SB |
| 2) No. 3 | 6,300 | 2.4 | 1.8 | 123 | 24.5 | SB |
| 3) No. 4 | 6,250 | 2.3 | 1.7 | 124 | 27.5 | SE-2 |
| 4) No. 6 | 6,350 | 2.4 | 1.6 | 123 | 24.0 | SB |
| 5) No. 7 | 6,100 | 2.3 | 1.5 | 124 | 27.0 | SE-2 |

Referring to Table II, it is readily demonstrated that the physical properties of the present invention compositions (e.g. formulation Nos. 3, 4, 6 and 7) are basically the same (except O.I. and UL 94 values) as the nylon material without the flame retardant (i.e. formulation No. 1). In view of the results set forth in Table II, it can be seen then that no adverse effect on physical properties via such use of the bis-phenoxy compound is realized.

Thus, the uniqueness and superiority of the present invention compositions is quite apparent.

EXAMPLE III

The procedure of Examples I and II are repeated except that the bis-phenoxy compound used corresponds to Formula IV, heretofor set forth, instead of Formulae II and III. Substantially the same results are obtained using the Formula IV compound as those obtained using Formulae II and III compounds.

EXAMPLE IV

The procedure of Examples I, II and III are repeated except that the enhancing agent used is zinc borate instead of $Sb_2O_3$. Substantially the same results are obtained using zinc borate as those obtained using $Sb_2O_3$.

EXAMPLE V

Strip samples of each of Formulation Nos. 1 (control) 3, 4, 6 and 7, Table I, are subjected to light stability tests via the use of a "Weather-Ometer", model 25/17 W. R., Atlas Electrical Devices Company, Chicago, Illinois. Utilizing an operating temperature of 145° F and a 50% relative humidity, each strip is subjected to 200 hours of "simulated daylight" via the use of a carbon arc. The results show that after 200 hours, there is no significant discoloration in any strip tested and which demonstrates that the present invention compositions are highly resistant to deterioration by light.

EXAMPLE VI

Samples of each of Formulation Nos. 1 (control), 3, 4, 6 and 7, Table I, are subjected to temperature (thermal) stability tests via the use of thermal gravimetric analysis (TGA). This test employed the use of a "Thermal Balance", model TGS-1, Perkin-Elmer Corporation, Norwalk, Conn. and an electrical balance, Cahn 2580 model, Cahn Instrument Company, Paramount, California. The results of these tests show that the bis-phenoxy compound containing Formulations had more than adequate stability for melt processing and subsequent heat aging (i.e. high temperature applications) and thus demonstrating that the particular bis-phenoxy compounds are quite compatible with the nylon material. The bis-phenoxy compound stability thus aids in providing sufficient flame retardancy at the nylon decomposition temperature. This test also demonstrates that the bis-phenoxy compounds do not exhibit migration.

The bis-phenoxy compounds are subjected to toxicity tests and it is found that these compounds are not toxic orally, not irritating to the eye and not irritating to the skin, all as measured by the guidelines of the Federal Hazardous Substances Act.

In view of the foregoing Examples and remarks, it is seen that the compositions, which incorporate the bis-phenoxy compounds, possess characteristics which have been unobtainable in the prior art. Thus, the use of bis-phenoxy compounds in nylon as flame retardants therefor is quite unique since it is not possible to predict the effectiveness and functionality of any particular material in any polymer system until it is actively undergone incorporation therein and the resultant plastic composition tested according to various ASTM Standards. Furthermore, it is necessary, in order to have commercial utility, that the resultant flame retarded plastic composition possess characteristics such as being non-toxic. Use of the bis-phenoxy compounds in nylon has accomplished all of these objectives.

The above examples have been described in the foregoing specification for the purpose of illustration and not limitation. Many other modifications and ramifications will naturally suggest themselves to those skilled in the art based on this disclosure. These are intended to be comprehended as within the scope of this invention.

What is claimed is

1. A plastic composition comprising a nylon and a flame retardant said flame retardant consisting of a compound having the formula

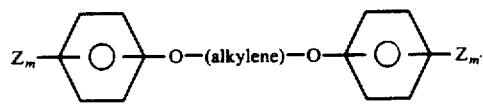

wherein (a) Z is bromine; (b) m and m' are independent and are integers having a value of from 1 to 5; and (c) alkylene is a straight or branched chain alkylene group having from one to six carbon atoms.

2. The composition as set forth in claim 1 wherein the amount of said compound employed is from about 5% to about 25% by weight, based on the total weight of said composition.

3. The composition as set forth in claim 2 wherein the alkylene group is $CH_2$.

4. The composition as set forth in claim 2 wherein the alkylene group is $(CH_2)_2$.

5. The composition as set forth in claim 2 wherein the alkylene group is $(CH_2)_3$.

6. The composition as set forth in claim 2 wherein the alkylene group is $(CH_2)_4$.

7. The composition as set forth in claim 2 wherein the alkylene group is

8. The composition as set forth in claim 2 wherein the alkylene group is

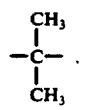

9. The composition as set forth in claim 2 wherein the alkylene group is $(CH_2)_2$ and $m$ and $m'$ are each 5.

10. A plastic composition comprising a nylon and a flame retardant, said flame retardant consisting of a compound having the formula

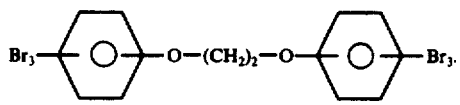

11. A plastic composition comprising a nylon and a flame retardant, said flame retardant consisting of a compound having the formula

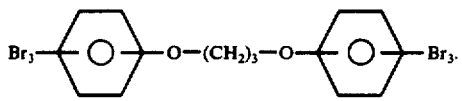

12. The composition as set forth in claim 1 wherein there is also present a flame retardant enhancing agent which promotes a cooperative effect with said compound to increase the flame retardancy of said composition, said agent being selected from the group consisting of $Sb_2O_3$, $SbCl_3$, $SbBr_3$, $SbI_3$, $SbOCl$, $As_2O_3$, $As_2O_5$, $ZnBO_4$, $BaB_2O_4.H_2O$, $Z.ZnO.3B_2O_3.3.5H_2O$ and stannous oxide hydrate.

13. The composition as set forth in claim 12 wherein said enhancing agent is antimony trioxide.

14. The composition as set forth in claim 10 wherein there is also present a flame retardant enhancing agent which promotes a cooperative effect with said compounds to increase the flame retardancy of said composition, said agent being selected from the group consisting of $Sb_2O_3$, $SbCL_3$, $SbBr_3$, $SbI_3$, $SbOCl$, $As_2O_3$, $As_2O_5$, $ZnBO_4$, $BaB_2O_4.H_2O$, $Z.ZnO.3B_2O_3.3.5H_2O$ and stannous oxide hydrate.

15. The composition set forth in claim 14 wherein said enhancing agent is antimony trioxide.

* * * * *